(12) United States Patent
Fioravanti (10) Patent No.: US 12,287,077 B2
(45) Date of Patent: Apr. 29, 2025

(54) OPTICAL DEVICE AND METHOD FOR PRODUCING SAME

(71) Applicant: Plastic Omnium Lighting Systems Gmbh, Munich (DE)

(72) Inventor: Fabio Fioravanti, Regensburg (DE)

(73) Assignee: Plastic Omnium Lighting Systems GmbH, Munich (DE)

(*) Notice: Subject to any disclaimer, the term of this patent is extended or adjusted under 35 U.S.C. 154(b) by 0 days.

(21) Appl. No.: 18/290,847

(22) PCT Filed: Jun. 9, 2022

(86) PCT No.: PCT/EP2022/065779
§ 371 (c)(1),
(2) Date: Jan. 22, 2024

(87) PCT Pub. No.: WO2023/001453
PCT Pub. Date: Jan. 26, 2023

(65) Prior Publication Data
US 2025/0067413 A1 Feb. 27, 2025

(51) Int. Cl.
*F21S 43/237* (2018.01)
*B60Q 1/50* (2006.01)
*F21W 103/60* (2018.01)

(52) U.S. Cl.
CPC ............ *F21S 43/237* (2018.01); *B60Q 1/503* (2013.01); *B60Q 2400/50* (2013.01); *F21W 2103/60* (2018.01)

(58) Field of Classification Search
CPC ........ F21S 43/237; F21S 43/26; B60Q 1/503; G03B 21/142; G03B 21/147
See application file for complete search history.

(56) References Cited

U.S. PATENT DOCUMENTS 10,724,699 B2 7/2020 Zhang et al.
10,753,562 B1 8/2020 Alisafaee
(Continued)

FOREIGN PATENT DOCUMENTS

DE 102019125264 A1 3/2021
WO WO2005/084245 A1 9/2005
WO WO2021/052837 A1 3/2021

*Primary Examiner* — Thomas M Sember (57) ABSTRACT

The invention relates to a method for producing an optical device (1) comprising at least one light source (16), at least one light guide (10) having an entry surface (11) facing the light source (16), and having an exit surface (12) formed at an end of the light guide (10) lying opposite the entry surface (11), in order to allow light entering into the light guide (10) to exit same, and a projection optics (20) which is designed to project the light exiting the exit surface (12) onto a projection plane (26) provided at a distance from and at an angle of inclination (γ) relative to a main direction of emission (Z) of the optical device (1). The method comprises the following steps: specifying a target distribution of the illuminance in the image (15) projected into the projection plane (26) by the projection optics (20); determining a non-homogenous distribution of the illuminance (Ev) of the light across the exit surface (12) from the distribution to be specified of the illuminance in the image (15) projected into the projection plane (26); determining a three-dimensional shape of the at least one light guide (10) with which the non-homogenous distribution of the illuminance (Ev) of the light across the exit surface (12) is generated when light is emitted by the at least one light source (16); and producing the light guide (10) with the three-dimensional shape and assembling the components of the optical device (1).

19 Claims, 7 Drawing Sheets

(56) References Cited

U.S. PATENT DOCUMENTS

| | | | | |
|---|---|---|---|---|
| 2004/0213001 | A1* | 10/2004 | Sayers | F21V 5/045 |
| | | | | 362/555 |
| 2004/0246739 | A1 | 12/2004 | Gebauer | |
| 2013/0258700 | A1* | 10/2013 | Schuch | G02B 6/0005 |
| | | | | 362/555 |
| 2016/0299288 | A1 | 10/2016 | Angelini et al. | |

* cited by examiner

OPTICAL DEVICE AND METHOD FOR PRODUCING SAME

CROSS-REFERENCE TO RELATED APPLICATIONS

The present application claims the priority of national German patent application 10 2021 207 955.5, which was filed on Jul. 23, 2021 and the disclosure of which is fully incorporated herein by reference and for all purposes.

DESCRIPTION

Technical Field

Aspects of the invention presented here relate to an optical device and to a method for producing the optical device, which device comprises a light source, a light guide with an entry surface and with an exit surface lying opposite the entry surface, and a projection optics having one or more optical elements, which projection optics is designed to project light radiated from the light source into the light guide via the entry surface and out of its exit surface completely or partially onto a projection plane provided at a distance from the optical device.

Prior Art

Such devices are used in particular in static projectors. In general, static projectors serve to generate an image of a logo or character in a projection plane which can be represented by any surface, for example a wall or a floor in a theater (stage lighting), or a road, etc. illuminated by a vehicle. Known static projectors are usually made up of a light source, frequently halogen lamps, or in particular also LEDs or laser diodes, an optics for collecting the light emitted by the light source, a modulator such as an image mask or a gobo (graphical optical blackout), and a projection optics.

With the aid of the collection optics, the light emitted by the light source can be directed, for example, onto a gobo, which, without limiting the generality, can be chromium- or aluminum-coated clear glass or, in the case of LEDs as light sources, can also be correspondingly coated or treated plastics. The transparent regions of the gobo are thereby illuminated so that an image of the mask defined by the gobo can then be generated in the projection plane by the projection optics.

In the automotive field, such static projectors are used, for example, in order to project company logos and/or information onto the ground surrounding the relevant vehicle. The projectors can be installed, among other things, in a vehicle door, in a door sill, in an exterior mirror, or in the region of the vehicle lights, etc. For example, a company logo of the corresponding vehicle manufacturer can be effectively projected onto the ground in the region of entry into the vehicle when the door is opened, as a result of which not only is the impression of the logo created, but helpful lighting assistance is also achieved when getting into the vehicle when dark light conditions prevail.

For the optics for collecting the light emitted by the light source, it is possible in particular to use light guides which can serve as light mixing rods or integrators. In the applications, they often have the shape of a narrowing rod (taper) and can be formed from a plastic, silicone, or glass. The light mixing due to multiple internal total reflections of the accumulated light beams at the side surfaces of the light guide leads to a homogenization of the resulting light beam bundle. More precisely, the multiple reflections at the side surfaces lead to a multiple folding and superposition of the radiation profile absorbed by the light source, the characteristics of which are thereby soft and homogenized in the case of a sufficiently long light guide. The degree of this homogenization depends here particularly also on the cross sections of the entry and exit surfaces and the (possibly also three-dimensional) shape of the side surfaces as well as especially also on the length of the light guide.

In WO 2021/052837 A1, an optical device having such a light guide is proposed. The optical device has a light source, a light guide having an entry surface and an exit surface, and a projection optics, which is designed to project a light radiated from the light source into the light guide via the entry surface and out of its exit surface onto a projection plane provided at a distance from the optical device in order to generate there an image of the geometric shape of the exit surface. In the case of the above example from the automotive field, the shape of the exit surface can correspond to the simple company logo, etc. to be projected. Consequently, the relevant mask or the gobo can be spared, as a result of which a maximum of light used can be projected onto the ground due to the absence of absorption (lack of mask). Furthermore, a component can be spared, which saves installation room and space.

Furthermore, WO 2021/052837 A1 also provides for a projection into a projection plane inclined relative to the main direction of emission. Because a geometrically distorted representation of the company logo or other character takes place due to the inclination of the projection plane, it is proposed there to compensate for the geometric shape of the exit surface to be imaged, so that the characters arising in the inclined projection plane are reproduced again geometrically correctly or undistorted.

In DE 10 2019 125 264 A1, an optical device is described which has a light source, a pinhole and an optical element which guides the light from the light source to an image mask. The optical element is designed as a free-form light guide. This has a hexagonal or octagonal exit surface. The light guide is divided into three portions, wherein the cross-section in a first portion increases from the hexagonal or octagonal cross-sectional shape of the entry surface in the direction of the exit surface while maintaining the cross-sectional shape. The adjoining portion includes a transition zone for adapting the, for example, hexagonal cross-section to a, for example, round cross-section.

PRESENTATION OF ASPECTS OF THE INVENTION

One object of some of the aspects described below is to further improve the quality of the projection or of the imaged pattern, logo or character in a projection plane inclined relative to the main direction of emission. An object of such or further aspects can also be to reduce the number of components and the installation space of the optical device in such an application, or, in the case of a simultaneous improvement of the projection as described, at least to safeguard and not to increase the number or installation space.

The object is achieved, inter alia, by a method for producing an optical device which comprises at least one light source, at least one light guide, and a projection optics having one or more optical elements. The at least one light guide has an entry surface facing the light source in order to couple a light emitted by the at least one light source into the light guide. Furthermore, it has an exit surface which is formed at an end of the light guide opposite the entry surface in order to allow the light entering into the light guide to exit from the light guide. The projection optics is designed to completely or partially project the light that has exited from the exit surface as an image of the exit surface on a projection plane provided at a distance from and at an angle of inclination γ relative to a main direction of emission Z of the optical device.

According to embodiments of the proposed method, a distribution to be achieved (target distribution) of the illuminance in the image projected into the projection plane by the projection optics is firstly specified. For example, such a target distribution, in the event of the projection into a projection plane within the image inclined by an angle of inclination γ, can be homogenous in order to compensate for the inhomogeneity therein described above, a so-called fade. Alternatively, however, it can also be intended to bring about such a fade (at any angle of inclination, that is to say also 90°, i.e., no inclination) as an effect.

Furthermore, a non-homogenous distribution of the illuminance Ev of the light across the exit surface is determined from the specified distribution of the illuminance in the image projected by the projection optics into the projection plane. This determination can be carried out by hardware- and/or software-based calculation, wherein here substantially the parameters with regard to the projection optics and the relative distances between the optical elements play a role.

Furthermore, a three-dimensional shape (design) of the at least one light guide can now be determined, with which the non-homogenous distribution of the illuminance of the light across the exit surface is generated when light is emitted by the at least one light source. In other words, the light guide (e.g., a taper) is produced (tailored) according to these embodiments so that the system of light source and light guide generates a distribution of the illuminance across the exit surface so that, as a result of the projection, the desired distribution of the illuminance is generated in the specified projection plane. This step can also be carried out by hardware and/or software, wherein the aim is basically achievable, but also by trial and error.

With these specifications obtained, the light guide with the three-dimensional shape can now be produced according to the usual methods. The optical device is then obtained by assembling the components.

With regard to the optical device of interest, the light guide can preferably be formed as a rod-shaped element (taper), which is aligned in a main direction of emission of the light source. The light source can preferably be an LED. For example, a plurality of LEDs arranged next to one another are also possible, e.g. four LEDs arranged in quadrants. The LEDs can also emit light of different wavelengths. Instead of LEDs, laser diodes or the like can also be provided. The emitted light collected by the light guide can also comprise wavelengths outside the visual range, in particular in the UV or IR wavelength range.

Furthermore, the optical device can comprise a projection optics having one or more optical elements, which projection optics is designed to project the light exiting from the exit surface completely or partially onto a projection plane provided at a distance from the optical device in order to generate an image there of the exit surface. This makes it possible in principle to design the exit surface to be similar to a cross-sectional shape that corresponds, for example, to a desired character, logo, or pattern to be imaged in the provided projection plane. The cross-sectional shape of the exit surface is therefore preferably different from the cross-sectional shape of the entry surface, which is preferably adapted to a shape of the light-radiating surface of the light source. In the case of one or more LEDs, the entry surface can, for example, preferably be rather square in order to collect as much light as possible. However, embodiments different therefrom are also included.

The intention of some of the aspects described below is to adapt the cross-sectional shapes or geometries of the exit surface beyond the mere compensation proposed in WO 2021/052837 A1, which rather only counteracts a distortion of the geometric shape during projection into a projection plane inclined relative to a main direction of emission.

According to embodiments, the aim is instead to also achieve a homogenous distribution of the illuminance of the projected light in the projection plane, for example the inclined projection plane, that is to say a homogenous distribution of the illuminance in the imaged character, logo, or pattern. According to aspects presented here, for example, the exit surface and the character, pattern or logo to be imaged thus do not need to be congruent. As described above, however, there may also be an intention to effect a so-called fade or other non-homogenous distributions in the projection plane as desired effects, this being achieved by special non-homogenous distributions of the illuminance in the exit surface.

Said main direction of emission can be an optical axis which is defined by the light source, the illumination optics or the light guide and the projection optics.

The present aspect now provides that, for example by a specific three-dimensional shape and/or extent or dimensions or position of the light guide, an illuminance across the exit surface is distributed non-homogenously, namely preferably on such a scale so that, during projection into the intended projection plane, an inhomogeneity, caused for example by the inclination of said projection plane, in the distribution of the illuminance in the image of the exit surface projected by the projection optics into the projection plane is substantially compensate for, or to achieve the aforementioned optical effects, such as a fade or the like.

In this case, the inhomogeneity, caused by the inclination of the projection plane, in the distribution of the illuminance of the image projected into the projection plane reflects the observation that, in this case, a region of the (inclined) projection plane that is further away from the exit surface and the projection optics receives light with a lower illuminance due to the greater distance than a region of the projection plane that is closer to the exit surface as a result of the inclination-provided that these regions are detected by the imaging.

The result is thus conventionally a non-homogenous distribution of the illuminance in the image generated in the projection plane if the illuminance in the exit surface, the cross section of which corresponds approximately to the character, pattern or logo, is homogenously distributed.

Figure 1:
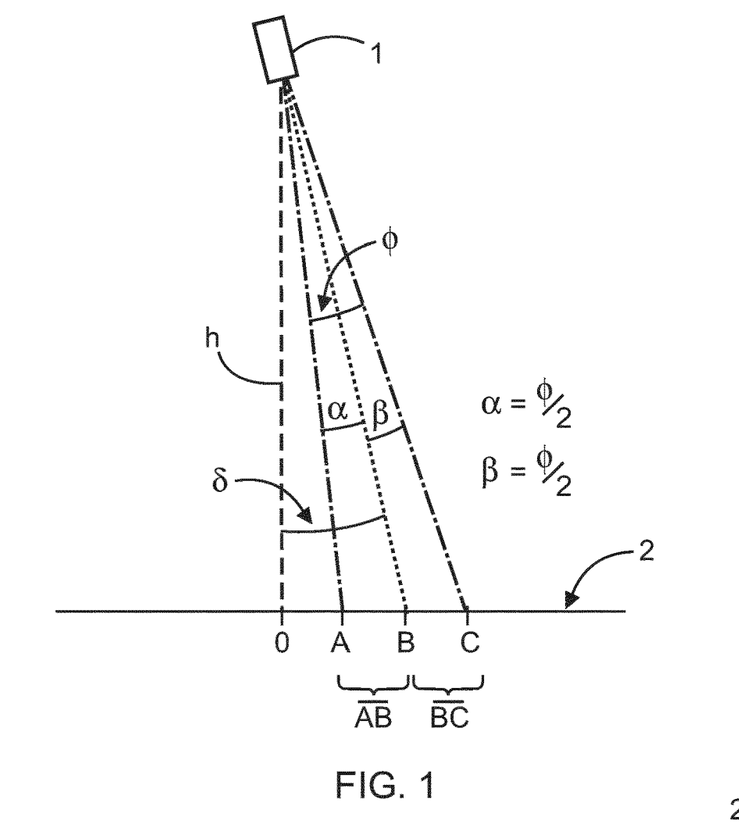
FIG. 1 shows a diagram of the problem of a non-homogenous distribution of the illuminance in a projection plane with oblique light irradiation.

This is to be illustrated in the representation shown in FIG. 1. An optical device 1 is located in an installation position (a position including alignment, e.g., on a vehicle in which the optical device is permanently installed) at a height h above the ground, for example a road, and projects a pattern, character or logo with a homogenous distribution of the illuminance in the original (e.g., exit surface or gobo, etc.) onto the road, which is considered here as a projection plane 2. The projection takes place at an angle δ of a main direction of emission (optical axis) relative to a vertical direction (parallel to the direction of the height h). In accordance with a solid angle of the projection of the pattern, character or logo, light is cast at an angle Φ (angular width of the radiation) in the direction of the road. If this angle Φ is divided into two identical proportions α=Φ/2 and β=Φ/2 and the distances AB and BC for the angles α and β, which are correspondingly illuminated in the case of the oblique projection at the angle δ onto the road, are compared, for geometric reasons the distance AB is smaller than the distance BC. However, since the luminous flux in both halves of the projection is the same, a lower illuminance results in the region of the longer distance BC than in the region of the distance AB, which is closer to the optical device when viewed from a distance. In other words, when an object is projected with a homogenous distribution of the illuminance onto a projection plane inclined relative to the main direction of emission, an image with a non-homogenous distribution of the illuminance is formed there. Some of the aspects proposed here are designed to compensate for this.

The projection plane provided for the projection, according to some specific embodiments presented here, can be, for example, a surface portion of a road, which is spaced apart laterally, forwards or backwards from a vehicle, such as a car, and onto which road portion a logo, character or pattern projects from the optical device from a fixed installation position on the vehicle. This surface portion is not part of the actual device, but a projection plane, even only a virtual projection plane, is defined at a distance and inclination angle by the focal distance of the projection optics and the close relationship between the inclination angle of the projection plane and the extent of the non-homogenous distribution of the illuminance caused in the exit surface.

According to a development of the method for producing the optical device, a shape and/or extent of one or more lateral side surfaces of the light guide can be altered by being adapted or tailored to a shape and/or extent of the corresponding side surfaces of a light guide in which the distribution of the illuminance of the light across the exit surface would be homogenously distributed. The adaptation takes place as described above in a hardware- and/or software-based manner—possibly also by tests (trial and error)—so that the target distribution of the illuminance in the image projected by the projection optics into the projection plane is obtained. This tailoring of lateral side surfaces of the light guide now makes the distribution of the illuminance of the light across the exit surface non-homogenous, as is necessary to achieve the desired distribution of the illuminance of the light in the projection plane.

The lateral side surfaces are defined by the cross-sectional shape developing along the optical axis or the main direction of emission of the light guide. For example, in the case of the preferably rod-shaped light guide, such side surfaces—in the conventional case planar side surfaces—can be tilted, curved, or rotated, etc., in order to obtain, in the exit surface, the desired non-homogenous distribution of the illuminance which, for example, serves to effect a homogenous distribution in the image of the exit surface generated in the projection plane. If a conventional structure, in which a homogenous distribution of the illuminance in the exit surface is imaged into a non-homogenous distribution of the illuminance in the projection plane, serves as a reference or comparative example, an asymmetrical cross section can also certainly result from a symmetrical cross section in the conventional case on account of the adaptation of the lateral side surfaces.

The same can apply according to a further development of the method for producing the optical device for the exit surface. In this case, the shape and/or extent of the exit surface can be adapted or modified or tailored in relation to a shape and/or extent of the corresponding exit surface of a light guide in which the distribution of the illuminance of the light would be distributed homogenously across said exit surface. Due to this tailoring of the exit surface, the distribution of the illuminance of the light across the exit surface is now also non-homogenous, as is necessary to achieve the desired distribution of the illuminance of the light in the projection plane. This development and the previously described development can be combined with one another. In general, tailoring one surface results in a corresponding adaptation of the other surface.

The exit surface can in particular assume a cross-sectional shape which does not necessarily only take into account and compensate for a geometric distortion of the projection in an inclined projection plane, as is proposed, among other things, in WO 2021/052837 A1, but it can also assume more complex shapes which affect the image in combination with the distribution of the illuminance.

Furthermore, according to a further development of the method for producing the optical device, a length of the light guide can be adapted to a corresponding length of a light guide in which the distribution of the illuminance of the light over the exit surface would be homogenously distributed. A combination with the above-described developments can also be considered here.

Overall, this can result in the three-dimensional structure of the light guide, that is to say the three-dimensional shape or the structure of all of the components which contribute to the mixing and homogenization of the light coupled in. Asymmetries and reduced lengths on the light guide (taper) can impair homogenization and thus contribute to the formation of a non-homogenous distribution of the illuminance, which is usually actually to be avoided.

The adaptation of the shape and dimensions of the light guide (lateral side surface(s), cross-sectional profiles, exit surface, total length, etc.) to be carried out for the relevant purpose can be determined for a predetermined angle of inclination and for a given distance and a desired shape of the character, logo or pattern to be imaged, for example by software and/or by trial and adaptation. It is possible to select the approach proposed in WO 2021/052837 A1 of an initially only geometric distortion of the exit surface with respect to the character, logo or pattern to be imaged in the (inclined) projection plane as a starting point, and, proceeding from this, to influence, by way of the described measures (adaptation of the lateral side surfaces, etc. of the light guide), the distribution of the illuminance in the cross section of the exit surface (whereby the distribution becomes non-homogenous) such that the character, logo or pattern (target) to be imaged in the projection plane obtains a correspondingly homogenous or also—as mentioned—targetedly non-homogenous distribution of the illuminance, as provided according to the original specification (target distribution).

It was found that these approaches make it particularly advantageous to dispense with an alternative solution to the problem in which a so-called fading mask to be specific would additionally be used in order to compensate for an inhomogeneity of the image generated in the inclined projection plane. This fading mask would be placed near the exit surface and, by means of light-absorbing structures, would bring about a locally greater attenuation of the light exiting from the exit surface where the correspondingly imaged regions are closer to the optical device due to the inclination of the projection plane. A homogenization of the distribution of the illuminance in the projected character, logo or pattern could thereby also be achieved.

The overall result using such a fading mask would, however, be a loss of the luminous flux contributing to the result on the one hand, and also an additional installation space requirement for the arrangement of the additional fading mask. As a result of the omission of such a fading mask, which is possible according to the proposed aspects, installation space can thus be saved, and a higher proportion of the light used by the light source(s) can be utilized to generate the image. Optionally, the light source(s) used can thus also be spared from requiring a greater amount of power, so that the optical device can also be more compact. In addition, the requirements for heat dissipation are reduced.

An aspect corresponding to the method described provides an optical device itself. The optical device comprises at least one light source, at least one light guide having an entry surface facing the light source in order to couple light emitted by the at least one light source into the light guide, and having an exit surface, which is formed at an end of the light guide opposite the entry surface, in order to allow the light coupled into the light guide to exit from the light guide, a projection optics having one or more optical elements, which is designed to completely or partially project the light that has exited from the exit surface as an image of the exit surface onto a projection plane provided at a distance from, and at an inclination angle γ relative to, a main direction of emission of the optical device. A three-dimensional shape of the light guide is designed such that an illuminance Ev of the light that has entered the light guide and been guided to the exit surface is distributed non-homogenously across the exit surface in order to achieve a specified distribution of the illuminance in the image projected by the projection optics into the projection plane.

In a further development of the optical device, in the light guide the entry surface has a first cross-sectional shape and the exit surface has a second cross-sectional shape, wherein, along the light guide in the main direction of emission, a corresponding cross-sectional shape of the light guide continuously transitions from the first cross-sectional shape into the second cross-sectional shape. This aspect represents an advantageous application of the described aspects to the tapers used in static projectors as light guides.

A similar development of the optical device provides that, in the light guide, the entry surface has a first cross-sectional area and the exit side has a second cross-sectional area. Along the light guide, a corresponding cross-sectional area of the light guide perpendicular to the main direction of emission increases continuously in the main direction of emission starting from the entry surface in the direction of the exit surface. This also represents an advantageous application of the described aspects to the tapers used in static projectors as light guides.

The extent of the inhomogeneity of the distribution of the illuminance Ev of the light across the exit surface, caused, among other things, by the aforementioned measures, depends on the effect to be achieved to be achieved in the projection plane. In the embodiment relating to the targeted compensation of the non-homogenous distribution of the illuminance formed in the projection plane due to the inclination of the projection plane precisely the extent of this inclination, or, in the case of a targeted fade in the projected image, the gradient thereof, etc. Also, conventional distributions of the illuminance over the exit surface that are considered to be homogenous do not have to be completely free of artifacts, fluctuations or small gradients at the edge that are not expressly intended. According to embodiments, a non-homogenous distribution of the illuminance can therefore be distinguished from a homogenous distribution of the illuminance by a proportion of the exit surface in which the illuminance is more than 90% of a maximum illuminance value, purely by way of example this proportion can be less than 70% of the cross-sectional area of the exit surface, less than 60%, less than 50%, less than 40% or less than 30%, etc., or can be defined for these limits.

Aspects of the proposed solution also relate to a vehicle which has an optical device according to the above-mentioned aspects, configurations or developments, wherein the main direction of emission of the optical device is directed at an oblique angle from a corresponding installation position on the vehicle to a ground surface on which the vehicle is standing or driving, wherein the ground surface forms the inclined projection plane.

Further advantages, features and details of the invention can be found in the claims, the following description of preferred embodiments and on the basis of the drawings. In the drawings, the same reference signs denote the same features and functions.

In the following description of preferred embodiments, it should be taken into account that the present disclosure of the various aspects is not limited to the details of the structure and the arrangement of the components as presented in the following description and in the drawings. The embodiments can be implemented or executed in various ways in practice. It should furthermore be taken into account that the wording and terminology used herein are used only for the purpose of this specific description and a person skilled in the art should not interpret these as such in a limiting manner.

Figure 2:
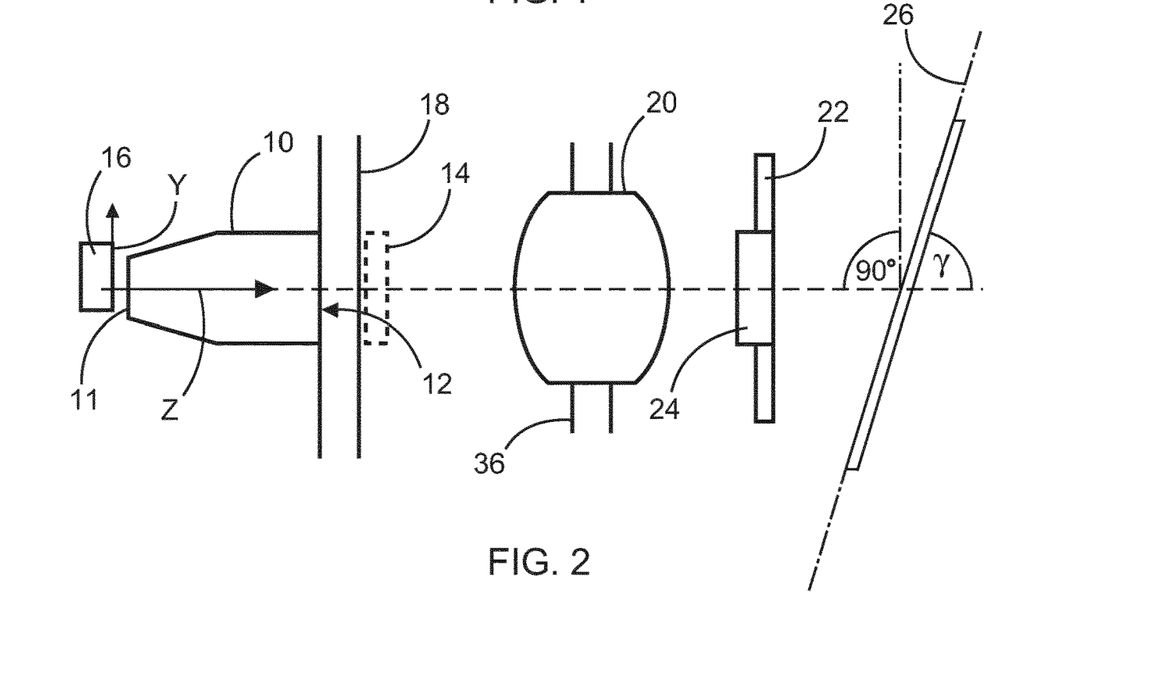
FIG. 2 is a schematic representation of an optical device in which an exit surface of a light guide is projected into an inclined projection plane.

An optical device 1, which, as shown in FIG. 1, images a character, logo or pattern in an inclined projection plane is shown in FIG. 2. The optical device 1 comprises a light source 16 in which, for example, one or more LEDs are arranged on a printed circuit board (not shown), the main beam direction of which is indicated by the axis Z. The axis Z can, for example, be arranged perpendicularly to a light-emitting surface of the LEDs. A coordinate axis Y denotes a direction perpendicular to the axis Z. The light source 16 is opposite an entry surface 11 of a light guide 10. The entry surface 11 can have a cross-sectional area that matches the geometric shape of the light emission surface of the LEDs, for example square, rectangular, etc. However, it can also be round or can have any other shape. The size, shape, and the distance between the entry surface 11 and the light source 16 are selected such that as much light as possible is collected from the light source 16 and can be coupled into the light guide 10. The entry surface 11 can be arranged in parallel with the light emission surface of the LEDs; an inclination thereof or even a curvature deviating from a flat surface can also be configured to achieve, in accordance with embodiments, a non-homogenous distribution of the illuminance in the exit surface 12 to be described below.

As shown schematically in FIG. 2, a diameter or a cross-sectional area of the light guide 10 increases continuously in the main direction of emission Z in the direction of an exit surface 12 opposite the entry surface 11 in the light guide 10 (at least in portions in FIG. 2). Such light guides are also referred to as tapers. The light guide 10 can be made, for example, from (quartz) glass, silicone or heat-resistant plastics, which are transparent to light in the visual wavelength range. The same or other materials can be considered for other wavelength ranges. A flange 18, which preferably extends perpendicularly to the main direction of emission Z of the light, is arranged on the exit surface 12. The flange 18 directly adjoins the exit surface 12 of the light guide 10 and is preferably formed in one piece with the light guide 10. By means of the flange 18, the light guide 10 can be fastened to and positioned on a holder (not shown in FIG. 2). The flange 18 further provides a function of reducing a luminance of the light that is coupled into a downstream projection optics 20 from the flange 18. It should be noted that the flange 18 can also be arranged at a different position than that shown in FIG. 2 on the light guide 10, or can also be omitted entirely.

A gobo 14 (graphical optical blackout) can optionally be provided between the exit surface 12 or the flange 18 and the projection optics 20. The projection optics 20 itself can comprise one or more optical elements, such as lenses. In accordance with embodiments, the optics can have a biconvex or concave-convex lens. The projection optics 20 is positioned at a suitable distance from the exit surface 12 in order to project the light exiting the light exit surface 12 into a projection plane 26 that can be inclined by an angle $\gamma \neq 90°$, that is to say is not perpendicular to the main direction of emission Z, in relation to the main direction of emission Z that can coincide for example with the optical axis of the projection optics 20. The projection plane 26 is imaginary as such, but can coincide with the surface of a wall or the ground, such as a road.

The light coupled from the projection optics 20 can impinge on a pinhole designed as an aperture 22, thereby improving the quality of the projected character, logo or pattern. The region of the aperture 22 that is open for the projected light is formed by a transparent window 24. The aperture 22 and the transparent window 24 can form a cover of the device. As a result, the components shown in FIG. 2 from the light source 16 to the projection optics 20 are protected from external influences.

Figure 3A:
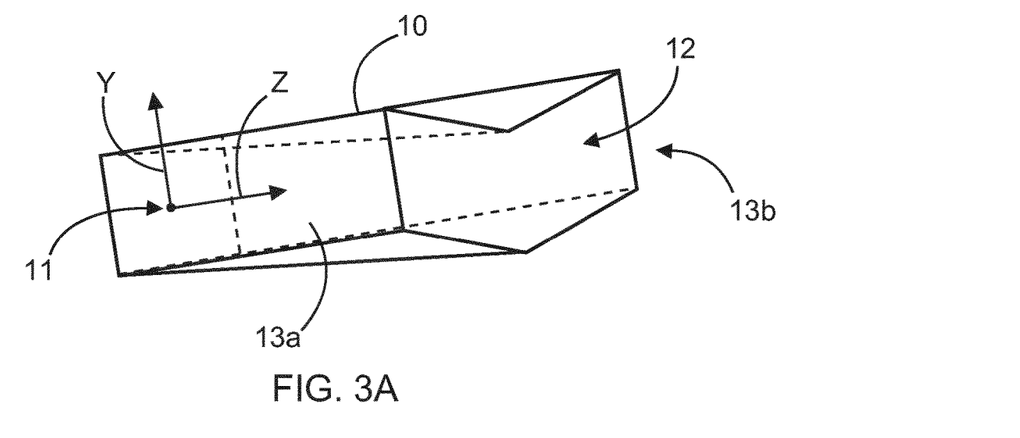
FIG. 3A is a perspective view of a light guide according to a conventional embodiment, as could be used in the optical device from FIG. 2.
Figure 3B:
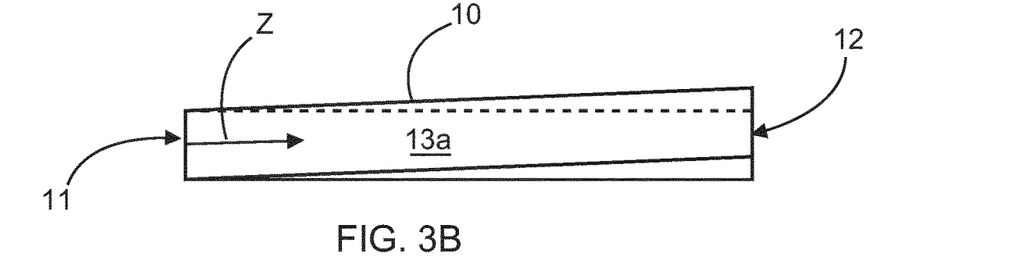
FIG. 3B is a side view of the light guide from FIG. 3A.

FIGS. 3A and 3B show a light guide 10 in a perspective and side view according to a conventional embodiment, as could be used in the optical device from FIG. 2. The light guide 10 shown can correspond to the light guide shown in FIG. 1 of WO 2021/052837 A1. The light guide 10 has a square entry surface 11 and an opposite exit surface 12, which assumes the geometric shape of a character to be projected into the inclined projection plane 26. Purely by way of example, this is the chevron character, a stylized arrow. The entry surface 11 and the exit surface 12 are substantially perpendicular to the main direction of emission Z. The lateral side surfaces of the light guide 10, of which only side surfaces 13a, 13b are provided with reference signs in FIG. 3A, convert the cross-sectional shape of the entry surface 11 (square) steadily or continuously along the main direction of emission Z into the corresponding cross-sectional shape of the exit surface 12.

Figure 4:
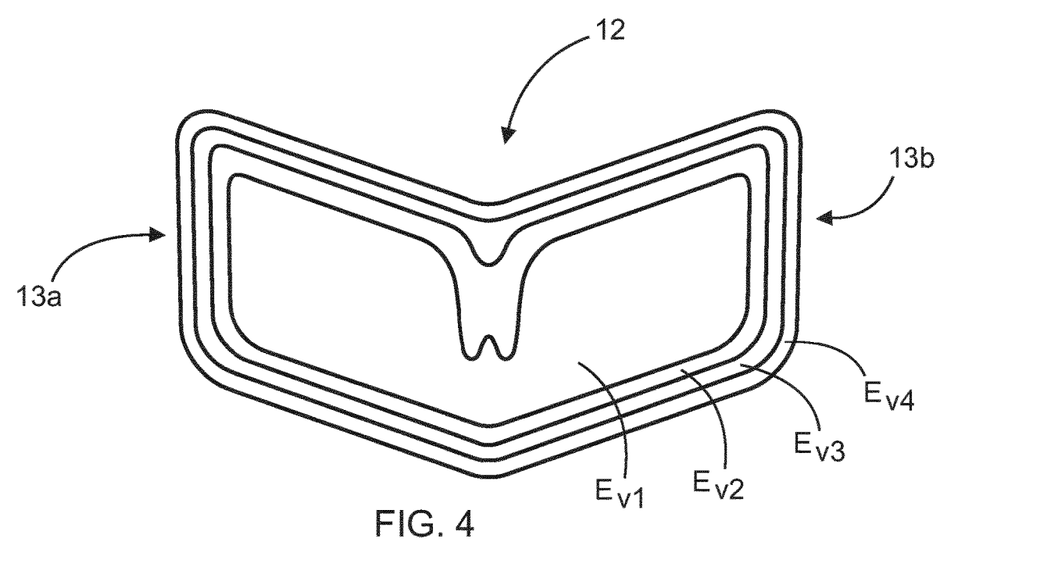
FIG. 4 shows an example of a substantially homogenous distribution of the illuminance in an exit surface of the light guide from FIG. 3A when it is used in the optical device from FIG. 2.
Figure 5A:
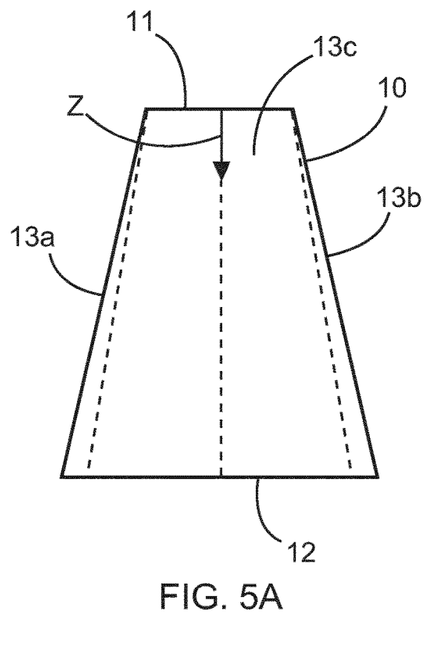
FIG. 5A is a schematic plan view of a light guide in according to a first embodiment of an optical device, which can be used in a device such as that according to FIG. 2 for projection into an inclined projection plane in order to effect a homogenous distribution of the illuminance in the image of the exit surface generated there.
Figure 5B:
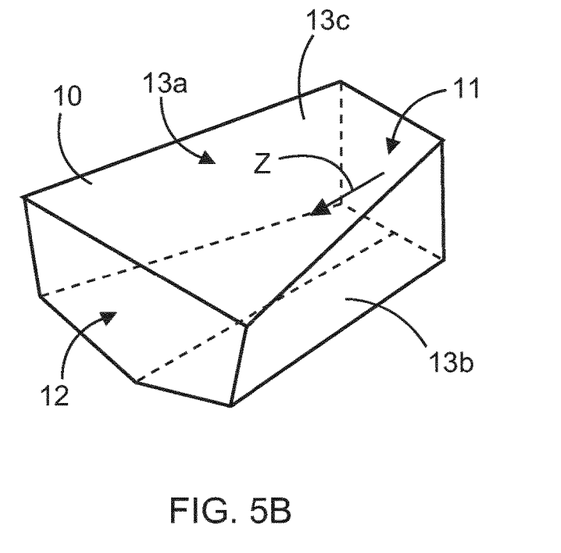
FIG. 5B is a perspective view of the light guide from FIG. 5A.
Figures 5C, 5D:
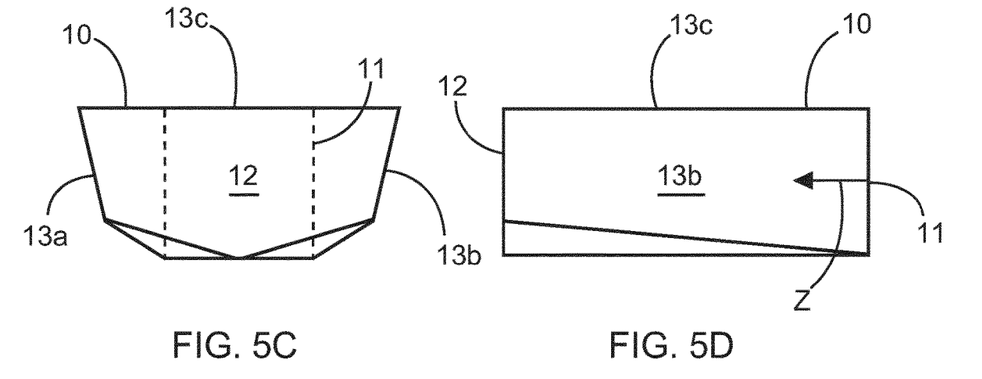
FIG. 5C shows the light guide from FIG. 5A, but in a view from the front with a view of the exit surface.
FIG. 5D shows the light guide from FIG. 5A, but in side view.

FIG. 4 shows a distribution of the illuminance Ev resulting for the light guide 10 from FIGS. 3A and 3B, which was determined across the exit surface 12 when the light guide 10 is used in the optical device 1 according to FIG. 2. In the contour line diagram of FIG. 4, only contour lines that represent the illuminances $E_{V1}, E_{V2}, E_{V3}, E_{V4}$ above 80% of the maximum value are imaged. The maximum value is 3.36.107 Lux, wherein $E_{V1}$ reflects the range of about 95 to 100% of the maximum value, $E_{V2}$ reflects the range of about 90 to 95% of the maximum value, $E_{V3}$ reflects the range of about 85 to 90% of the maximum value and $E_{V4}$ reflects the range of about 80 to 85% of the maximum value. Only the region delimited by the contour line $E_{V1}$ already assumes an area proportion of about 50% of the exit surface 12 of the conventional light guide. For the contour line $E_{V2}$ the values are already approximately 70 to 75%. A correspondingly projected image in a projection plane perpendicular to the main direction of emission Z would be detected by the human eye (as desired) as characters with a substantially homogenous distribution of the illuminance. In the event of a projection into an inclined projection plane 26 as shown in FIGS. 1 and 2, however, in the image for the same optical device 1, a decrease in the intensity in character parts which are further away from the optical device 1 due to the inclination would be perceived.

FIG. 5A to 5D show a light guide 10 according to an embodiment in which the same character as in the comparative example from FIGS. 3A and 3B is to be projected into the projection plane 26 by means of the structure of an optical device 1 shown in FIG. 2, namely the chevron character. The basic structure of the light guide 10 is similar to that in the comparative example from FIGS. 3A and 3B, but on the one hand the length of the light guide 10 here is selected to be significantly shorter in order to reduce the effect of the homogenization of the light guide 10, and in addition the lateral side surfaces 13a and 13b are tilted outward in the main direction of emission Z starting from the square entry surface 11 and at the same time twist (torsion). At the same time, the height of the chevron character, i.e., in the "arrow direction" of the character, is also slightly reduced, while the corners of the exit surface 12 facing away from the "arrow tip" of the chevron character are pulled outward. In the embodiment, it is notable that the edge of the exit surface 12 opposite the arrow tip in the exit surface 12 and toward the base surface 13c, in contrast to the conventional case of FIGS. 3A and 3B, does not have the triangular recess on the inside. As described hereinafter, this is necessary for the present embodiment in order to obtain a distribution of the illuminance Ev which brings about a substantially homogenous distribution of the illuminance in the projected image in the projection plane 26.

Figure 6:
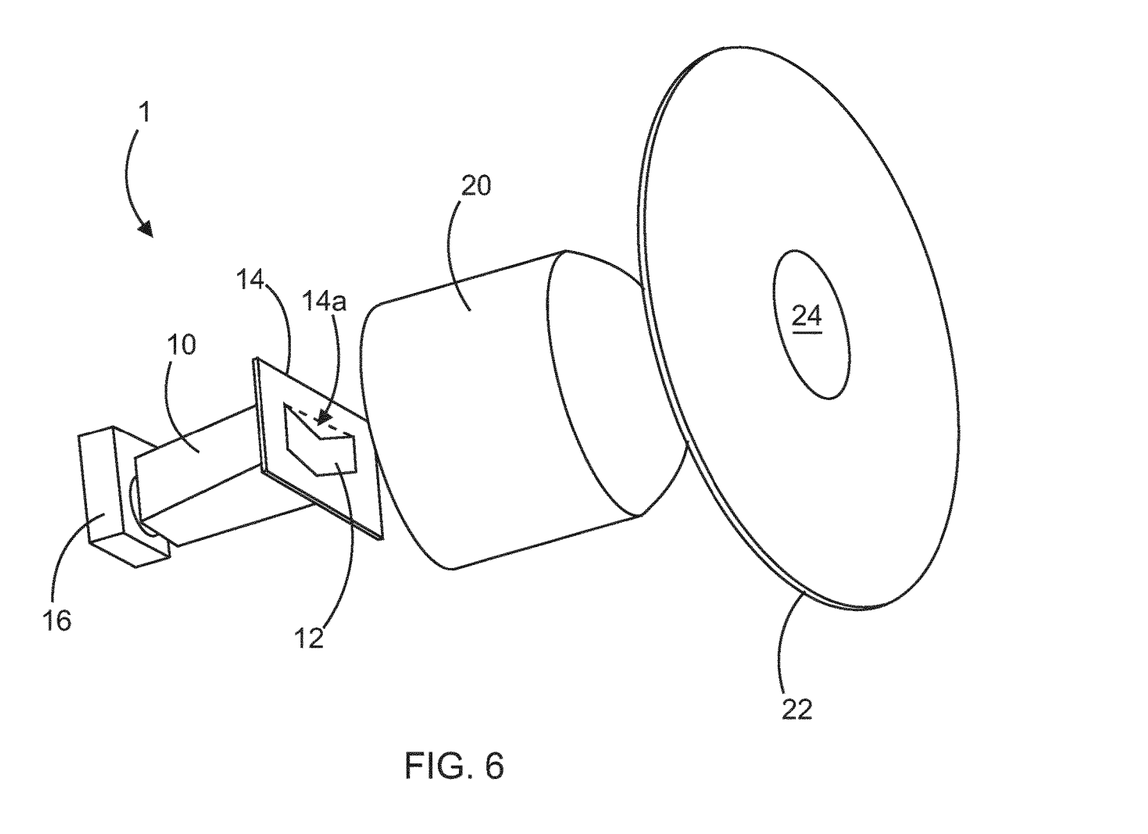
FIG. 6 is a schematic perspective view of the optical device according to the first embodiment.

FIG. 6 is a schematic overview of the corresponding optical device 1 of the embodiment having the light guide 10 from FIG. 5A to 5D in a perspective view. The basic structure is the same as in FIG. 2, i.e., at least one light source 16, the light guide 10 from FIG. 5A to 5D with the entry surface 11 and the exit surface 12, a projection optics 20, and an aperture 22 or pinhole with a transparent window 24 are set up in this order in the main direction of emission Z or along the optical axis. The projection optics 20 is shown here as a concave-convex projection lens. However, a special gobo 14 which serves as a mask for the exit surface 12 is also provided here as a special feature. The unmasked area of the gobo 14 substantially corresponds to the cross-sectional shape of the exit surface 12 of the light guide 10, wherein, however, the triangular region 14a, which was not excluded in the case of the exit surface 12 according to the embodiment from FIG. 5A to 5D in comparison with the conventional shape according to FIGS. 3A and 3B (in order to achieve a desired non-homogenous distribution in the exit surface), is now subsequently (after exit from the exit surface 12) absorbed here by the masked triangular region 14a of the gobo.

Figure 7:
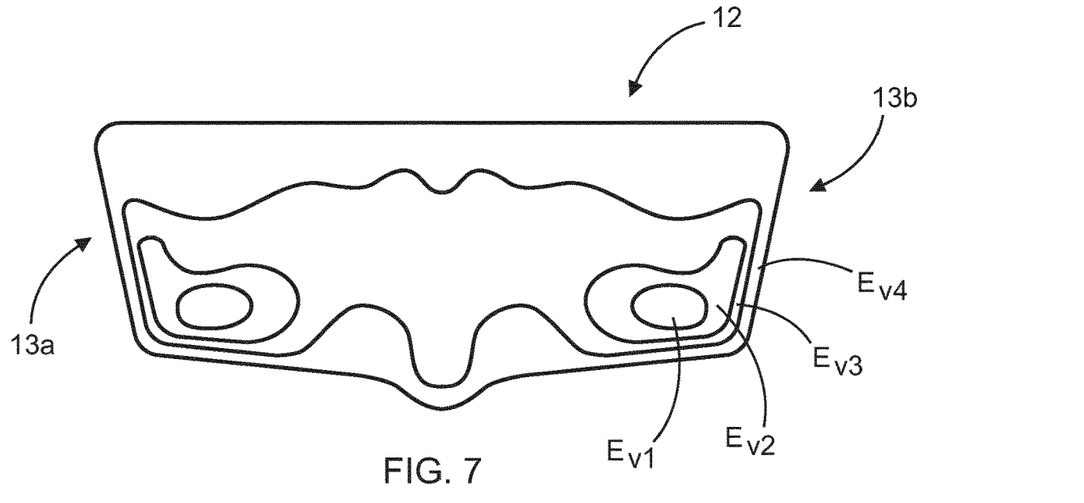
FIG. 7 shows an example of a substantially non-homogenous distribution of the illuminance in an exit surface of the light guide from FIG. 5A-5D, which results when the light guide in the optical device from FIG. 6 is supplied with light from the light source thereof.

FIG. 7 shows a distribution of the illuminance Ev resulting for the light guide 10 from FIG. 5A to 5D, which was determined across the exit surface 12, when this light guide 10 is now used in the optical device 1 according to FIG. 2 or as shown in FIG. 6. In the contour line diagram of FIG. 7, similar to that previously in FIG. 4 for the conventional case, only those contour lines that represent the illuminances $E_{V1}$, $E_{V2}$, $E_{V3}$, $E_{V4}$ above 80% of the maximum value are imaged. The maximum value is 2.79.107 Lux, wherein $E_{V1}$ reflects the range of about 95 to 100% of the maximum value, $E_{V2}$ reflects the range of about 90 to 95% of the maximum value, $E_{V3}$ reflects the range of about 85 to 90% of the maximum value and $E_{V4}$ reflects the range of about 80 to 85% of the maximum value.

As can be seen in FIG. 7, a significantly non-homogenous distribution of the illuminance Ev results across the exit surface. In particular, two separate maxima can be seen on the left and right of the "arrow tip" of the chevron character. The region delimited by the contour line $E_{V1}$ assumes an area proportion of only about 5% of the exit surface 12 of the conventional light guide. For the contour line $E_{V2}$ the value is only approximately 10%.

The non-parallel edges of the exit surface 12 toward the lateral side surfaces 13a and 13b are also clearly visible, which are made parallel to one another only with the projection into the inclined projection plane. It should be noted here that the light guide and the exit surface 12 are geometrically designed and adapted such that the inclination of the projection plane 26 points in the direction of the arrow tip of the chevron character, i.e., with the imaging, the projected arrow tip is spatially furthest away from the optical device 1 as a result of the inclination.

Figure 9A:
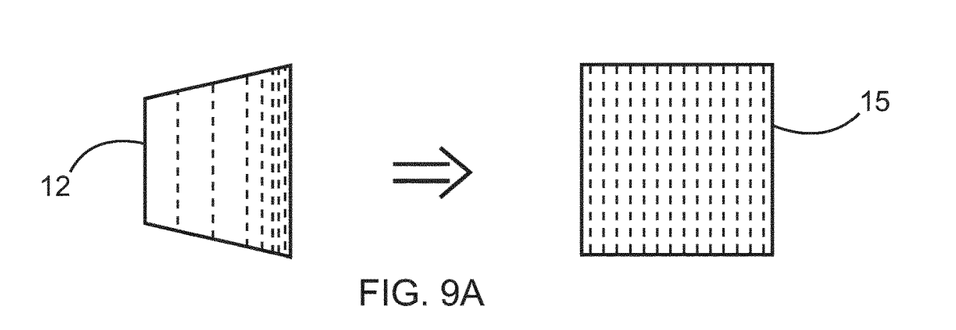
FIG. 9A is a schematic representation of the adaptation of an exit surface in such a way that a desired geometric shape; here a square—with a homogenous distribution of the illuminance after projection into the inclined projection plane is achieved.
Figure 9B:
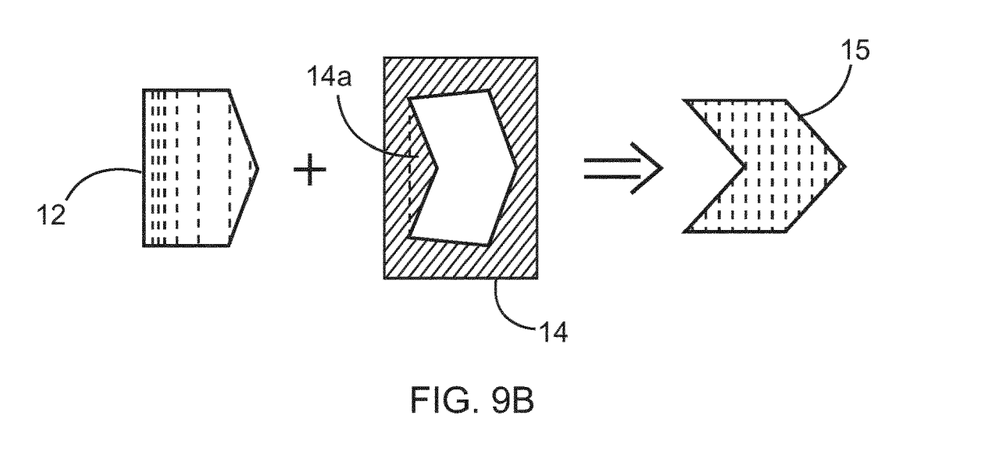
FIG. 9B is a schematic representation of the adaptation of an exit surface in such a way that a desired geometric shape with a homogenous distribution of the illuminance after projection into the inclined projection plane is achieved; in this case a Chevron character (arrow) with further assistance of a gobo as in the embodiment in FIG. 6.

The effect of the projection of the light from the exit surface 12 by the projection optics 20 into the inclined projection plane 26 (as shown in FIG. 2) is shown schematically in FIG. 9B. The illuminance EV is shown by the density of the dashed lines. The superposition of the exit surface 12 with corresponding distribution of the illuminance EV by the gobo 14 with the masked region 14a leads, with this projection, to an image 15 (chevron) generated in the inclined projection plane 26, with a homogenous distribution there of the illuminance EV. In other words, the inhomogeneity in the distribution of the illuminance in the exit surface that is intentionally brought about according to the embodiments leads, in the projected character in the projection plane, to a compensation of the non-homogenous distribution of the illuminance generated per se by the inclination having the angle γ≠90° (e.g., 80°, 70°, 60°, 50°, 40°, etc. or intermediate values).

Figure 8A:
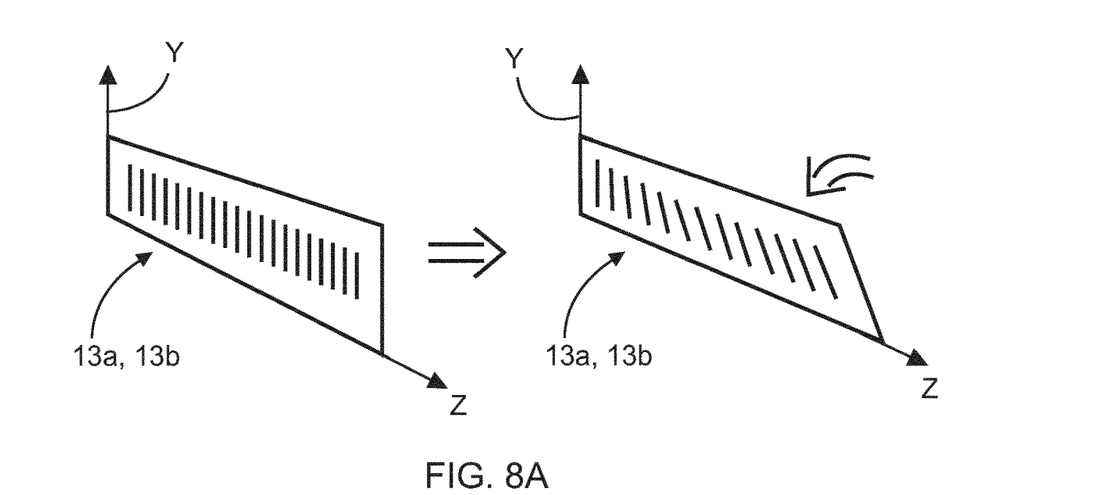
FIG. 8A is a schematic representation of an exemplary measure carried out by way of example on the light guide proceeding from the prior art in order to achieve a non-homogenous distribution of the illuminance as in FIG. 7, this being here tilting and/or twisting a side surface of the light guide.
Figure 8B:
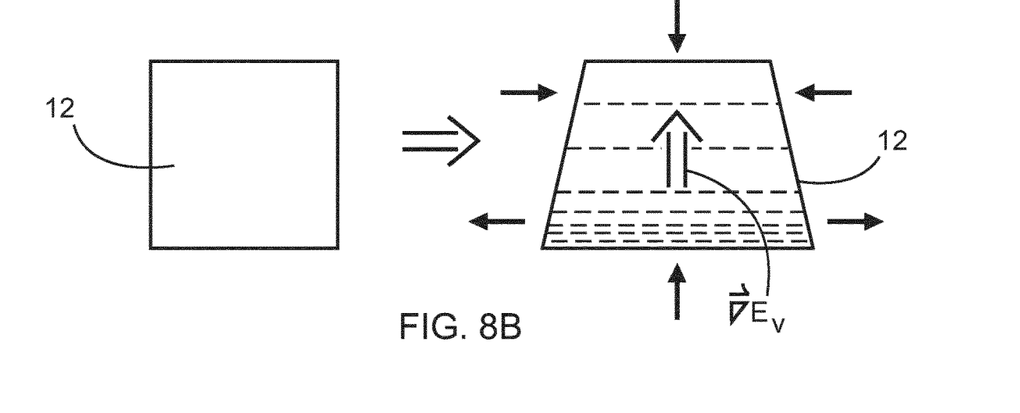
FIG. 8B is a schematic representation of a further exemplary measure carried out by way of example on the light guide proceeding from the prior art in order to achieve a non-homogenous distribution of the illuminance as in FIG. 7, this being here a geometric adaptation of the exit surface.
Figure 8C:
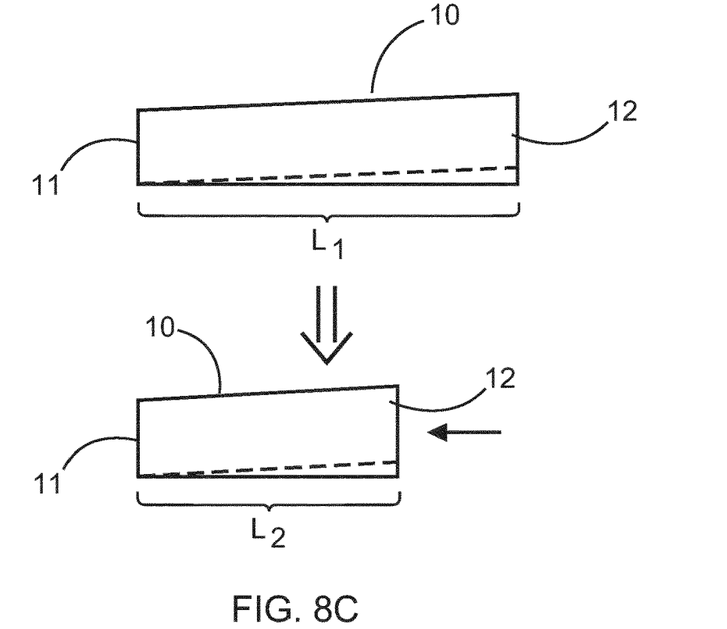
FIG. 8C is a schematic representation of a further exemplary measure carried out by way of example on the light guide proceeding from the prior art in order to achieve a non-homogenous distribution of the illuminance as in FIG. 7, this being here a reduction of the length of the light guide.

FIG. 8A to 8C again show, purely by way of example, the measures carried out at the light guide 10 in order to achieve the distribution of the illuminance Ev shown in FIG. 7, namely the tilting or twisting of the lateral side surfaces 13a, 13b in FIG. 8A, a geometric correction of the exit surface 12 in FIG. 8B that takes the spatial projection into account and a reduction in the length of the light guide 10 in FIG. 8C.

FIG. 9A shows how an adaptation of the geometric shape of the exit surface 12 is to be carried out for simpler geometric shapes than the chevron character (here a square) in order to obtain the desired shape and a homogenous distribution of the illuminance EV in the projected image 15. However, it should be noted that the non-homogenous distribution of the illuminance in the exit surface 12, indicated on the left in FIG. 9A, has to be brought about by further measures on the light guide 10, because generally the mere geometric adaptation of the exit surface 12 alone is not sufficient for this purpose. In the case of simpler geometric shapes which are to be imaged, the additional gobo 14 and the masking 14a can generally be spared so that space is saved and the efficiency of the optical device is increased.

Figure 10:
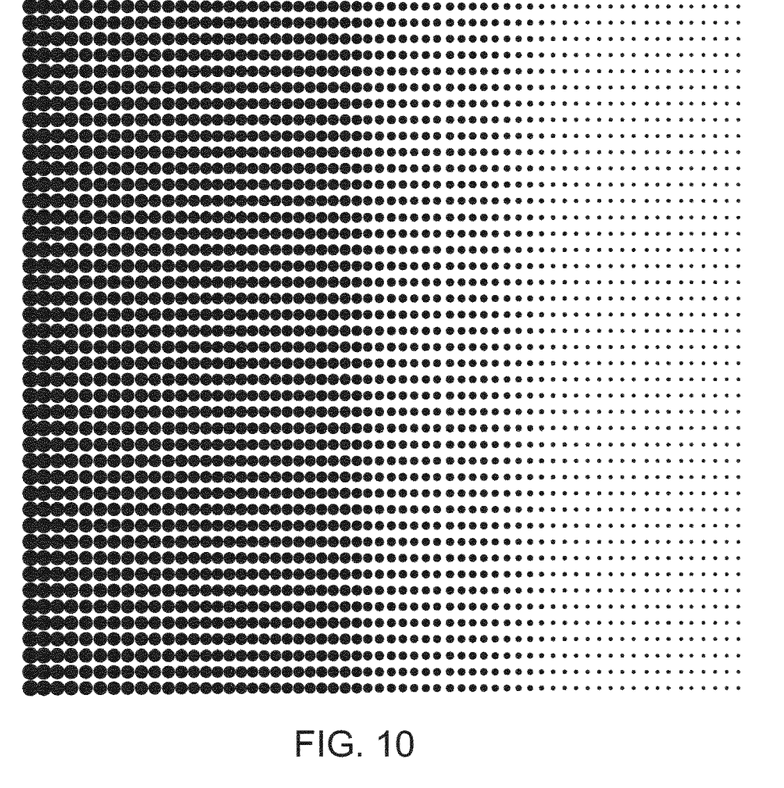
FIG. 10 to illustrate a comparative example, shows a fading mask which can be used in the optical device according to FIG. 2 instead of adapting the light guide (according to embodiments) in order to achieve the aim of a homogenous distribution of the illuminance after projection into the inclined projection plane.

FIG. 10 shows a fading mask which represents a comparative example in connection with FIG. 2. The fading mask could be arranged instead of the (optional) gobo 14 in FIG. 2. With this fading mask, a homogenous distribution of the illuminance Ev in the exit surface 12 (as can be obtained, for example, by the light guide 10 from FIGS. 3A and 3B) can be influenced in such a way that a distribution as shown in FIG. 7 results, which is then projected by the projection optics 20 into the projection plane 26. The effect that compensates for the inclination of the projection plane 26 would be the same as in the embodiments, but there is thus an additional component to be considered which additionally absorbs light and thereby reduces the efficiency of the device. The fading mask can be formed, for example, by the points which become larger or denser as a result of the pattern shown in FIG. 10.

Figure 11:
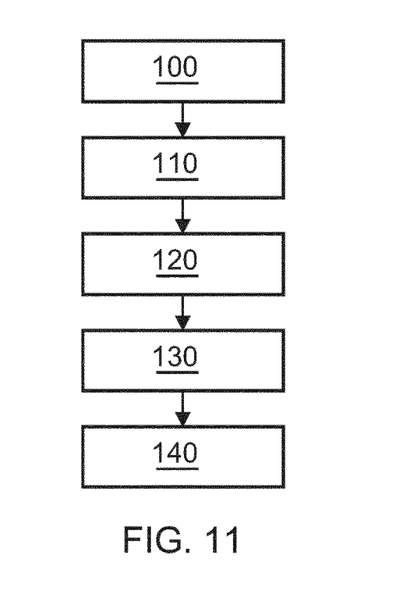
FIG. 11 shows a flow diagram with a sequence of a method for producing the optical device according to one embodiment.

FIG. 11 shows, in a schematic flow diagram, an overview of an embodiment of a method for producing an optical device 1 as has been described above, for example. In a first step 100, the components such as the light source(s) 16, the projection optics 20, the aperture 22, a power supply and/or controller (not shown) etc. are provided. In a next step 110, a target distribution to be achieved of the illuminance in the image 15 projected into the projection plane 26 by the projection optics 20 is specified. In a subsequent step 120, a non-homogenous distribution of the illuminance Ev of the light across the exit surface 12 is then determined, specifically from the distribution to be specified for the illuminance in the image 15 projected into the projection plane 26. In a further subsequent step 130, a three-dimensional shape of the at least one light guide 10 is determined, with which the non-homogenous distribution of the illuminance Ev of the light across the exit surface 12 is generated when light is emitted by the at least one light source 16. The three-dimensional shape of the light guide 10 can be determined in any desired way, for example by programs for optical simulation. In this case, for example, certain specifications for selectable parameters can be made, such as the length of the light guide 10 or the shape of the exit surface 12 or the shape of the entry surface etc. while other parameters such as the shapes of the lateral side surfaces are varied, and the result of the distribution of the illuminance forming in each case is compared with the specified target distribution, wherein changes in the relevant parameter are derived from a possible difference for a next iteration step. Alternatively, the three-dimensional shape of the light guide 10 can also be determined on a purely experimental basis, for example by trial and error. Other methods known in this technical field for designing a three-dimensional shape for light guides are also possible. If the parameters (coordinates and lengths of the surface elements, for example in the form of CAD data) for the three-dimensional shape of the light guide have been determined, in a further step the light guide 10 is produced in conventional manufacturing facilities for optical components (dead-mold casting, laser treatment, etc.) having the three-dimensional shape and is assembled with the further components of the optical device 1.

The optical device described in the above embodiments can be implemented in a vehicle, in particular in a motor vehicle. Reference is made to FIG. 7 in WO 2021/052837 A1. A motor vehicle is shown there in a plan view that shows arrangements (reference sign 28 there) with three optical devices each (indicated there by reference signs 46, 48, 50), which each project a chevron-like character onto the surface of the road. The positions 74, 76 denoted in FIG. 7 by reference signs 74 and 76 show possibilities for positioning a projection via the arrangement. Instead of the optical devices proposed in WO 2021/052837 A1, an embodiment of a motor vehicle according to present aspects provides precisely the optical device 1 proposed here in the motor vehicle shown in FIG. 7 of WO 2021/052837 A1. FIG. 7 is therefore intended to be included in the disclosure of the present description by reference. A plurality of such optical devices 1 can also be combined in arrangements in order to image combined characters. It is also possible for two or more such arrangements to then be arranged in the vehicle, so that the characters are each projected onto different positions correspondingly (indicated in FIG. 7 of WO 2021/052837 A1, for example by reference signs 74 and 76). In a further embodiment, the vehicle can also have a further arrangement on the opposite side of the vehicle at the rear of the vehicle so that at least one further projection can be projected.

Aspects of the invention are not limited to certain angles of inclination for the projection plane into which projection is performed by the optical device; examples of a specified inclination of the projection plane can, however, be an angle γ of 85° or less, 80° or less, further 70° or less, or even only 60° or less. However, the aspects proposed here also relate to the case that the projection plane is not inclined (i.e., has an inclination angle γ of 90° to the projection plane), while nevertheless a non-homogenous distribution is deliberately brought about in the exit surface, namely in order to effect, for example, a fade effect in the projection plane, for example if the "tail" of the chevron-like character is to peter out starting from the tip in the projection plane with decreasing illuminance, etc.

It should further be noted that, according to embodiments of the projection optics in the beam path, a pinhole or aperture which improves the quality of the projected character, logo or pattern, and also a transparent covering for protection from external influences can be arranged downstream, and/or a flange formed in one piece with the light guide can also be provided on said light guide, by means of which flange the light guide can be fastened to and/or positioned on a holder, for example.

LIST OF REFERENCE SIGNS

1 Optical device
10 Light guide
11 Entry surface
12 Exit surface
13a, 13b, 13c Lateral side surfaces
14 Gobo
14a Masked region (superposed exit surface)
16 Light source
18 Flange
20 Projection optics
22 Aperture, pinhole
24 Transparent window (in pinhole)
26 Projection plane (inclined)
36 Holder (projection optics)
Z Main direction of emission, optical axis
γ Inclination angle (projection plane)

The invention claimed is:

1. A method for producing an optical device (1), the optical device comprising:
at least one light source (16);
at least one light guide (10) having an entry surface (11) facing the light source (16) in order to couple light emitted by the at least one light source (16) into the light guide (10), and having an exit surface (12) which is formed on an end of the light guide (10) lying opposite the entry surface (11) in order to allow the light coupled into the light guide (10) to exit therefrom;

a projection optics (20) having one or more optical elements and designed to completely or partially project the light that has exited from the exit surface (12) as an image (15) of the exit surface (12) on a projection plane (26) provided at a distance from, and at an inclination angle (γ) relative to, a main direction of emission (Z) of the optical device (1), wherein the method further comprises:

specifying a target distribution of an illuminance (Ev) in the image (15) projected by the projection optics (20) into the projection plane (26);

determining a non-homogenous distribution of the illuminance (Ev) of the light across the exit surface (12) from the distribution to be specified for the illuminance in the image (15) projected into the projection plane (26);

determining a three-dimensional shape of the at least one light guide (10), with which the non-homogenous distribution of the illuminance (Ev) of the light across the exit surface (12) is generated when light is emitted by the at least one light source (16); and producing the light guide (10) with the three-dimensional shape and assembling the components of the optical device (1).

2. The method according to claim 1, wherein
a cross-sectional shape of the exit surface (12) of the light guide (10) is associated with a character, logo or pattern which corresponds to the image (15) projected into the inclined projection plane (26).

3. The method according to claim 1, wherein
the inclination angle (γ) of the projection plane (26) provided for the projection relative to the main direction of emission (Z) of the optical device (1) is different from 90°, and
the three-dimensional shape of the light guide (10) is designed such that the illuminance (Ev) of the light is distributed non-homogenously across the exit surface (12) so that, in the projection into the provided projection plane (26), an inhomogeneity caused by the inclination of said projection plane is substantially compensated for in the distribution of the illuminance in the image (15) of the exit surface (12) projected into the projection plane (26).

4. The method according to claim 1, wherein
a shape and/or extent of one or more lateral side surfaces (13a, 13b, 13c) of the light guide (10) is adapted to a shape and/or extent of the corresponding side surfaces of a light guide, in which the distribution of the illuminance of the light across the exit surface is homogenously distributed in order to obtain the target distribution of the illuminance in the image (15) projected by the projection optics (20) into the projection plane (26).

5. The method according to claim 1, wherein
a shape and/or extent of the exit surface (12) is adapted to a shape and/or extent of the corresponding exit surface of a light guide, in which the distribution of the illuminance of the light across said exit surface is homogenously distributed in order to obtain the target distribution of the illuminance in the image (15) projected by the projection optics (20) into the projection plane (26).

6. The method according to claim 1, wherein
a length (L2) of the light guide (10) is adapted to a corresponding length (L1) of a light guide, in which the distribution of the illuminance of the light across the exit surface is homogenously distributed in order to obtain the target distribution of the illuminance in the image (15) projected by the projection optics (20) into the projection plane (26).

7. A vehicle comprising an optical device (1) produced according to the method according to claim 1, wherein the main direction of emission (Z) of the optical device (1) is directed at an oblique angle from a corresponding installation position on the vehicle to a ground surface on which the vehicle is standing or driving, wherein the ground surface forms the inclined projection plane.

8. An optical device (1) comprising
at least one light source (16);
at least one light guide (10) having an entry surface (11) facing the light source (16) in order to couple light emitted by the at least one light source (16) into the light guide (10), and having an exit surface (12) which is formed on an end of the light guide (10) lying opposite the entry surface (11) in order to allow the light coupled into the light guide (10) to exit therefrom;
a projection optics (20) having one or more optical elements and designed to completely or partially project the light that has exited from the exit surface (12) as an image (15) of the exit surface (12) on a projection plane (26) provided at a distance from, and at an inclination angle (γ) relative to, a main direction of emission (Z) of the optical device (1),
wherein:
a three-dimensional shape of the light guide (10) is designed such that an illuminance (Ev) of the light that has been coupled in and guided to the exit surface (12) is distributed non-homogenously across the exit surface (12) in order to achieve a specified distribution of the illuminance in the image (15) projected by the projection optics (20) into the projection plane (26).

9. The optical device (1) according to claim 8, wherein
a cross-sectional shape of the exit surface (12) is associated with a character, logo or pattern which corresponds to the image (15) projected into the inclined projection plane (26).

10. The optical device (1) according to claim 8, wherein
the inclination angle (γ) of the projection plane (26) provided for the projection relative to the main direction of emission (Z) of the optical device (1) is different from 90°, and
the three-dimensional shape of the light guide (10) is designed such that the illuminance (Ev) of the light is distributed non-homogenously across the exit surface (12) in such a way that, in the projection into the provided projection plane (26), an inhomogeneity caused by this inclination in the distribution of the illuminance is substantially compensated for in the image (15) of the exit surface (12) projected into the projection plane (26) by the projection optics (20).

11. The optical device (1) according to claim 8, wherein,
in the light guide (10), the entry surface (11) has a first cross-sectional shape and the exit surface (12) has a second cross-sectional shape, wherein, along the light guide (10) in the main direction of emission (Z), a corresponding cross-sectional shape of the light guide continuously transitions from the first cross-sectional shape into the second cross-sectional shape, and/or
in the light guide (10), the entry surface (11) has a first cross-sectional area and the exit surface (12) has a second cross-sectional area, wherein, along the light guide in the main direction of emission (Z) starting from the entry surface (11), a corresponding cross-sectional area of the light guide (10) perpendicular to the main direction of emission (Z) increases continuously in the direction of the exit surface (12).

12. The optical device (1) according to claim 8, wherein a cross-sectional shape of the entry surface (11) is adapted to a cross-sectional shape of an emission surface of the at least one light source (16), or, in the case of a plurality of light sources, to the arrangement of the corresponding emission surfaces.

13. The optical device (1) according to claim 8, wherein the light guide (10) has a flange (18) which is arranged at a distance from the entry surface (11) and extends in a direction perpendicular to the main direction of emission (Z).

14. The optical device (1) according to claim 8, wherein no gobo (14) is provided between the exit surface (12) and the projection optics (20).

15. The optical device (1) according to claim 8, wherein no fading mask is provided between the exit surface (12) and the projection optics (20).

16. The optical device (1) according to claim 8, wherein, in the distribution of the illuminance (Ev) of the light across the exit surface (12), a portion of the exit surface (12) in which the illuminance is more than 90% of a maximum illuminance value is less than 50% of the cross-sectional area of the exit surface (12).

17. The optical device (1) according to claim 8, wherein, in the distribution of the illuminance (Ev) of the light across the exit surface (12), a portion of the exit surface (12) in which the illuminance is more than 90% of a maximum illuminance value is less than 30% of the cross-sectional area of the exit surface (12).

18. The optical device (1) according to claim 8, wherein the specified inclination of the projection plane (26) is an angle ($\gamma$) of 85° or less, preferably 80° or less, further preferably 70° or less, even more preferably 60° or less.

19. A vehicle comprising an optical device (1) according to claim 8, wherein the main direction of emission (Z) of the optical device (1) is directed at an oblique angle from a corresponding installation position on the vehicle to a ground surface on which the vehicle is standing or driving, wherein the ground surface forms the inclined projection plane.

* * * * *